United States Patent [19]

Schumacher

[11] Patent Number: 4,828,040
[45] Date of Patent: May 9, 1989

[54] SIDE UNLOADING AUTOMATIC SOD HARVESTING APPARATUS

[75] Inventor: Kenneth Schumacher, Pleasantville, Ohio

[73] Assignee: Teledyne Princeton, Inc., Canada

[21] Appl. No.: 79,677

[22] Filed: Jul. 30, 1987

[51] Int. Cl.$^4$ ............................................. A01B 45/04
[52] U.S. Cl. ........................................ 172/19; 172/20; 172/33; 414/541; 414/789.9; 414/930; 414/924
[58] Field of Search ......................... 172/19, 20, 33, 63, 172/67, 167, 667, 668, 742; 414/70, 71, 82, 111, 488, 541

[56] References Cited

U.S. PATENT DOCUMENTS

| | | | |
|---|---|---|---|
| 2,617,347 | 11/1952 | Provost | 172/20 |
| 4,109,729 | 8/1978 | Kaercher, Jr. | 172/19 |
| 4,162,709 | 7/1979 | Wilson | 172/20 |
| 4,162,726 | 7/1979 | Hudson et al. | 172/20 |
| 4,294,316 | 10/1981 | Hedley et al. | 172/20 |
| 4,597,707 | 7/1986 | Cornacchia | 414/70 |

Primary Examiner—Deborah L. Kyle
Assistant Examiner—J. Woodrow Eldred
Attorney, Agent, or Firm—Francis T. Kremblas, Jr.

[57] ABSTRACT

A mobile automatic sod harvesting apparatus of the type which severs a sod strip from the ground parallel to the direction of travel, cuts the strips into sod pads of predetermined length and conveys the sod pads rearwardly toward a sod stacking and unloading station is disclosed which features a side unloading configuration to permit a pallet loaded with sod pads to be unloaded laterally of the direction of travel of the apparatus. The side unloading feature is further characterized by a lift fork assembly slideably mounted for horizontal displacement at right angles to the path of travel of the harvesting apparatus. The lift fork assembly which supports a sod receiving pallet is vertically movable at adjustable height to aid stacking the pallet with sod pads and for depositing a loaded pallet onto the ground upon horizontal extension of the lift assembly at a right angle to the path of travel of the apparatus.

7 Claims, 6 Drawing Sheets

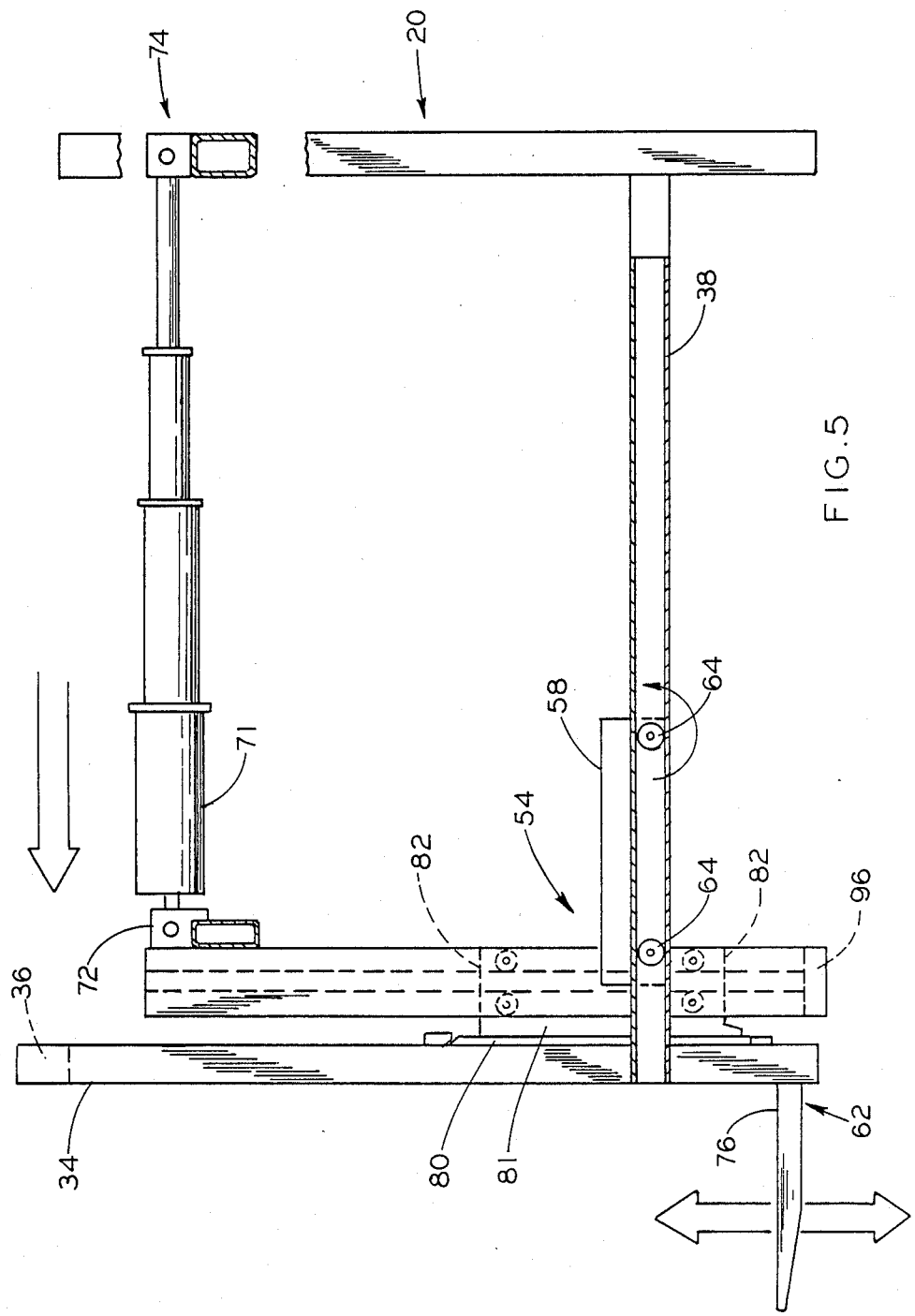

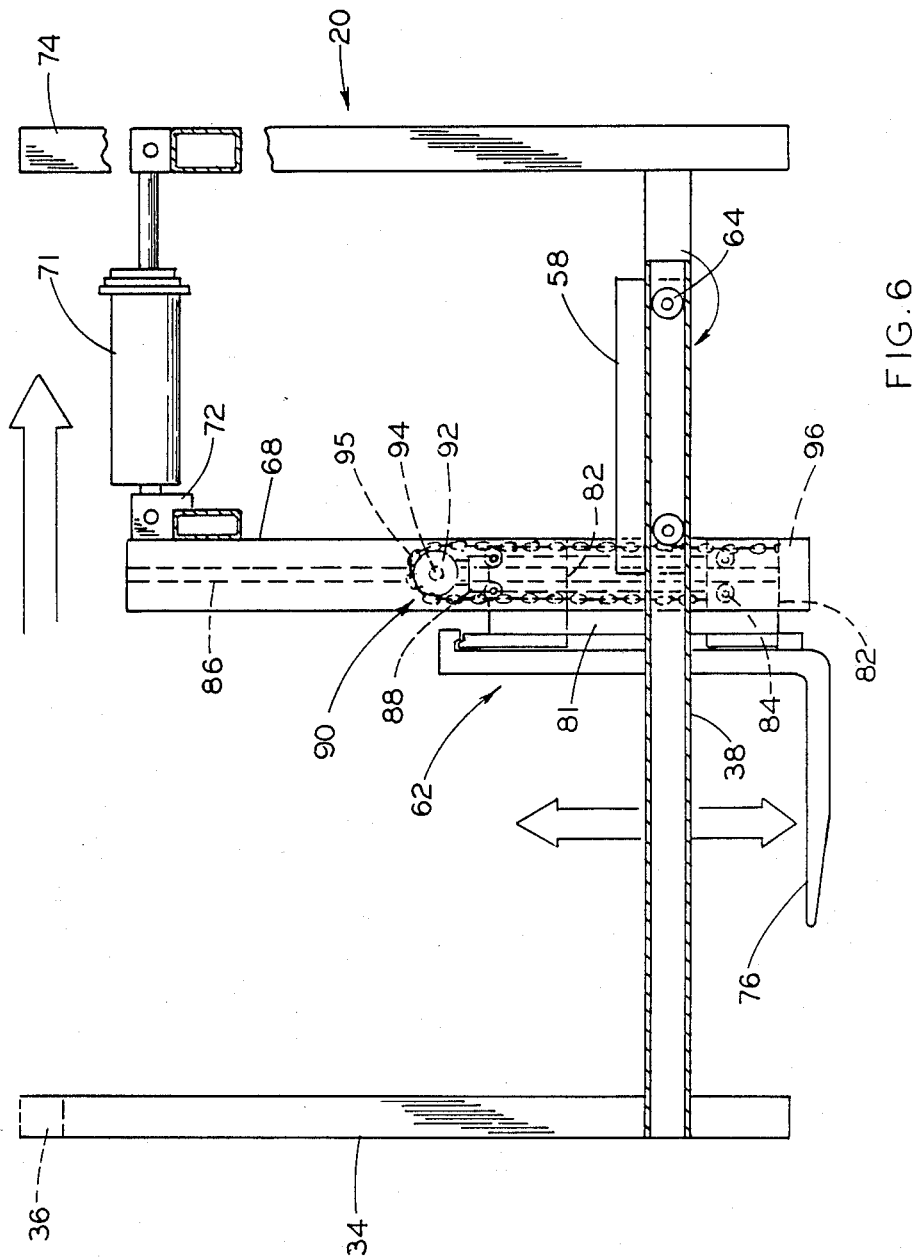

SIDE UNLOADING AUTOMATIC SOD HARVESTING APPARATUS

BACKGROUND

Automatic sod harvesting apparatus have been used for many years by the sod growing industry to more efficiently remove the sod. Self propelled harvesters have been redesigned in an effort to improve production rates, reduce labor costs and improve the quality of removing, severing and handling of the sod pads harvested.

Examples of typical automatic sod harvesters are represented by prior U.S. Pat. Nos. 3,672,452; 3,887,013; 3,590,927 and 2,617,347.

It has long been recognized that labor costs represent a very significant portion of the cost of harvesting the sod and many prior art efforts have been directed to attempts to improve handling of the sod in a manner which reduces the labor requirements.

Typically, the sod strips severed from the ground in these types of harvesters are cut into predetermined lengths to form sod pads. These pads are conveyed rearwardly from the forward cutting head to a loading and/or unloading station.

In the very early models, the sod pads were merely pushed individually onto the ground for later retrieval.

In most modern instances, the sod pads are automatically folded, rolled into a cylindrical configuration or left flat prior to being stacked onto a sod-receiving pallet.

Other versions have tried to automate the stacking of the sod pads onto a pallet, however, at present such configurations have met with little commercial acceptance.

Prior to the present invention, the stacking and pallet unloading operations have been conducted such that the loaded pallet must be removed from the harvester at the rear thereof. The pallets, then, are retrieved by a suitable accessory apparatus, such as a fork lift, for transport and loading to a delivery truck. However, since the loaded pallet is deposited rearwardly and along the line of travel, it is positioned to interfere with the next adjacent pass of the harvester. Therefore, an additional worker is necessary to concurrently operate the lift fork vehicle to remove the loaded pallets from the path of the harvester prior to its next pass through the sod field.

SUMMARY OF THE INVENTION

The present invention relates to an automatic sod harvesting apparatus which conventionally severs and removes a strip of sod from the ground parallel to its direction of travel and particularly to such an apparatus which includes a loading and unloading station that provides for displacing a loaded pallet laterally of the path of travel such that it does not interfere with the return pass of the harvester to remove another strip of sod contiguous to the strip last removed from the ground.

The loading and unloading station features a horizontally movable lift assembly which is slideably mounted to a pair of spaced guide rails extending laterally to the path of travel of the main frame of the harvester.

A fork lift portion is vertically movable to support a pallet at variable heights during loading of the pads and to eventually lower the loaded pallet to deposit the same on the ground.

In accordance with the present invention, the loading and unloading feature eliminates the necessity of providing an additional workman solely to operate the accessory fork lift vehicle concurrently with harvesting operation to remove the loaded pallets from the field.

As an additional advantage, even with the concurrent use of the fork lift vehicle to remove loaded pallets, the harvester never has to delay its cutting operation if the pallet removal operation is unable to keep pace, for any reason, with the cutting operation.

As another aspect of the present invention, the lift assembly conveniently provides a fork lift assembly which may be retracted and raised to a loading position closely adjacent to a sod pad receiving station to aid the manual loading of the pallets. Further, the lift assembly may be lowered in increments under the control of the operator to maintain the ease of loading sod pads onto the pallet as the pallet becomes full.

The present invention provides a sod harvesting apparatus which significantly reduces harvesting production costs, provides ease and convenience to the operators and further possesses a configuration which adds little, if any, extra overall width compared to the prior art rear loading and unloading sod harvester apparatus.

BRIEF DESCRIPTION OF THE DRAWINGS

FIG. 5 is a partial rear elevational view in section of the sod loading and unloading station shown in FIG. 4, the section being taken along line A—A in FIG. 4, illustrating the lift assembly in a horizontally extended position similar to that shown in FIG. 2; and FIG. 6 is a rear elevational view similar to that shown in FIG. 5 illustrating the lift assembly in a horizontally retracted position similar to that shown in FIG. 1.

DETAILED DESCRIPTION OF PREFERRED EMBODIMENT

Figure 1:
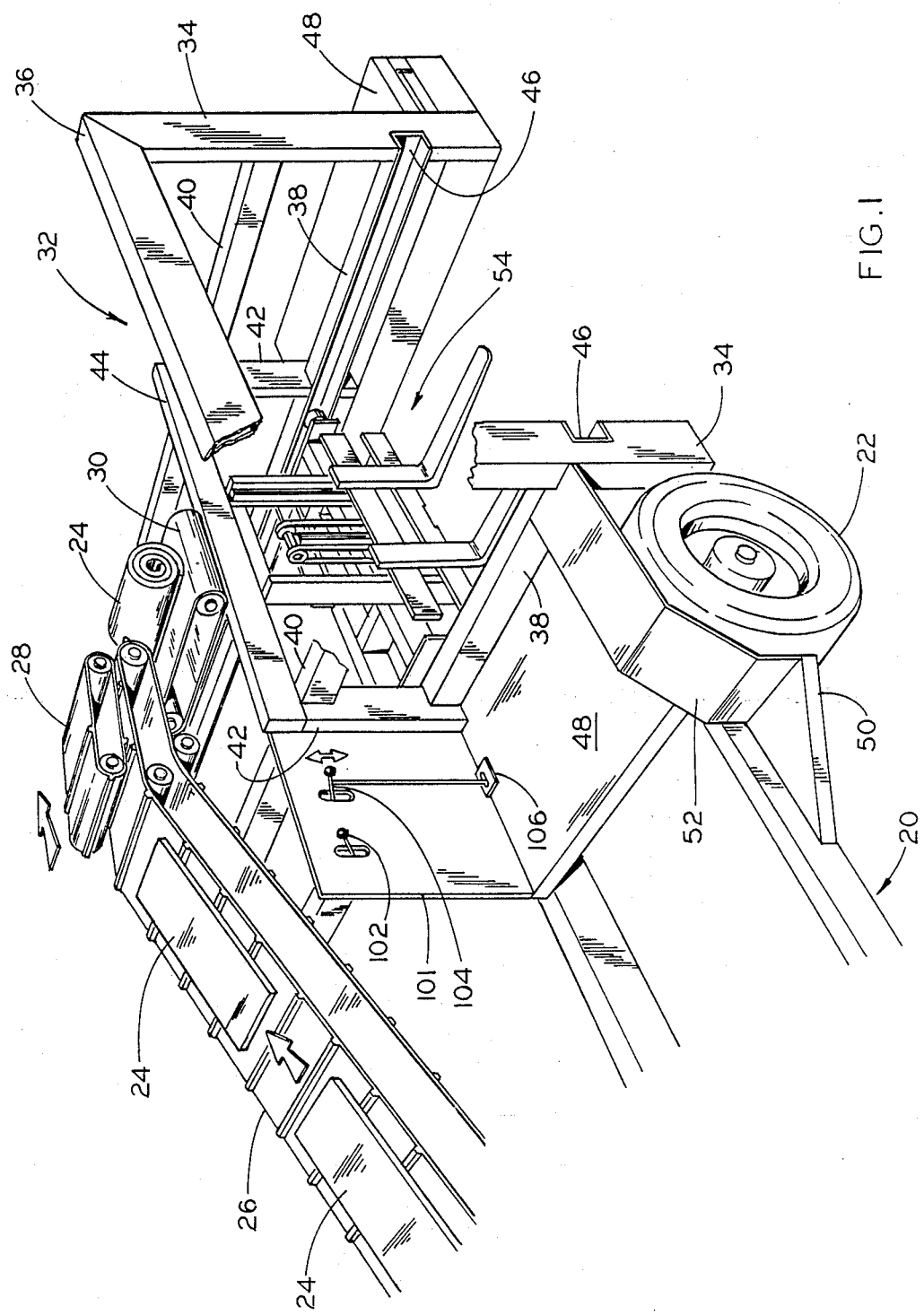
FIG. 1 is a partial view of an automatic sod harvesting apparatus provided with a laterally disposed sod unloading station constructed in accordance with the present invention illustrating the horizontally movable fork lift assembly disposed at a retracted position.
Figure 2:
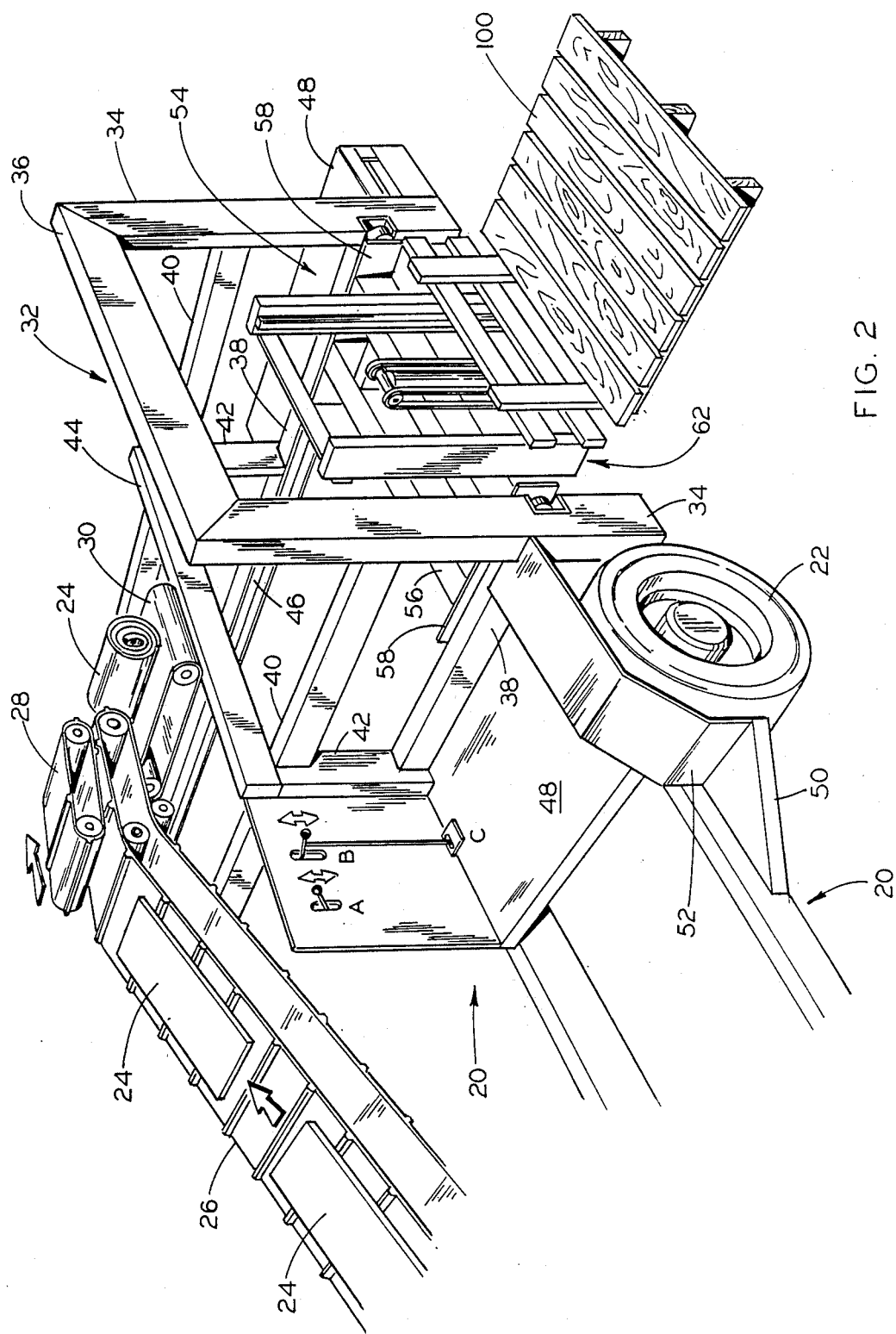
FIG. 2 is a partial perspective view of the automatic sod harvesting apparatus shown in FIG. 1 illustrating the horizontally movable fork lift assembly disposed at an extended position.
Figure 3:
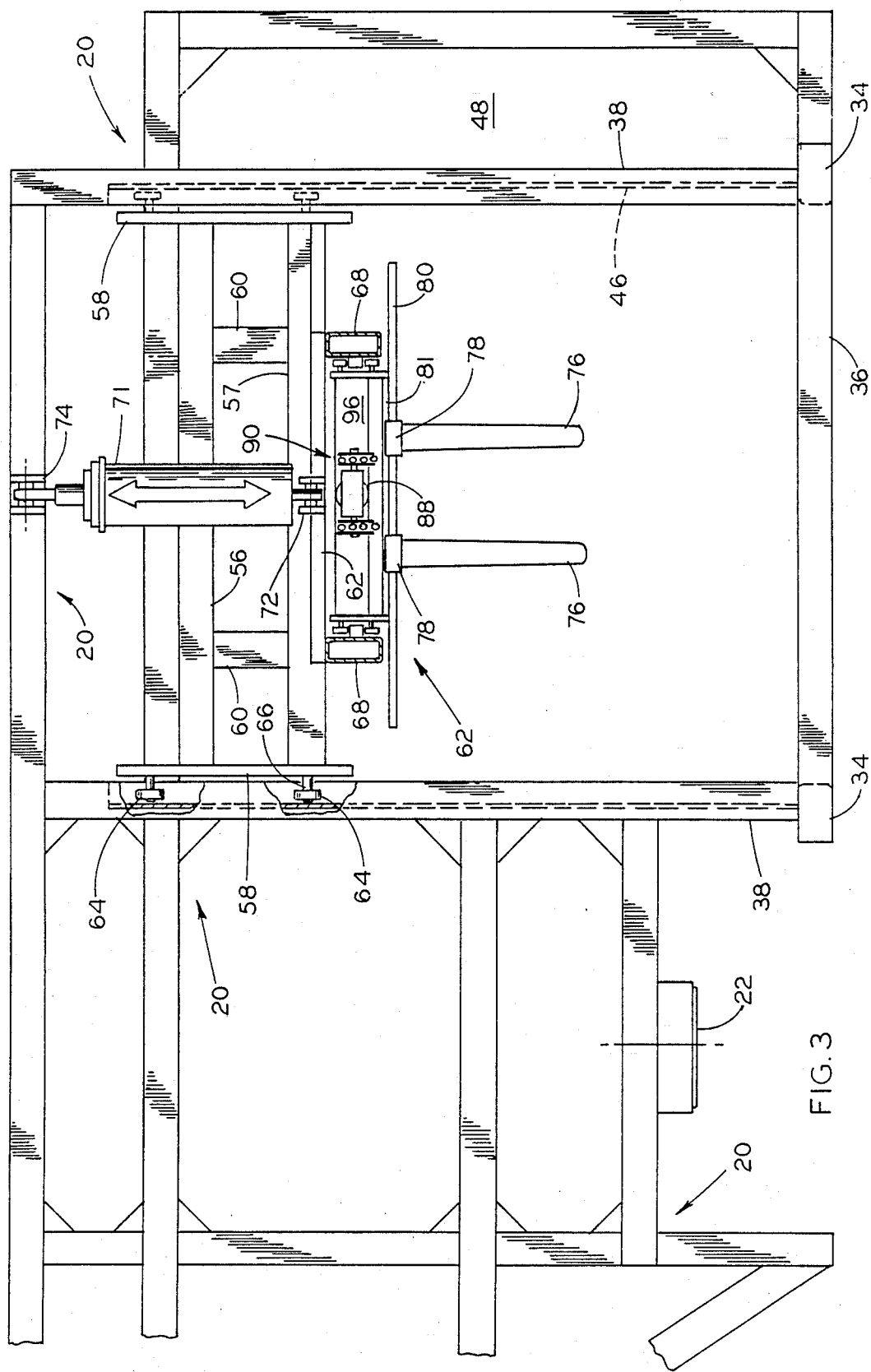
FIG. 3 is a partial plan view of the main frame support of the apparatus shown in FIG. 1 and primarily shows the auxiliary support frame for the sod loading and unloading station apart from the remaining apparatus which includes the sod conveying means, the sod receiving station and the forwardly located cutting head.
Figure 4:
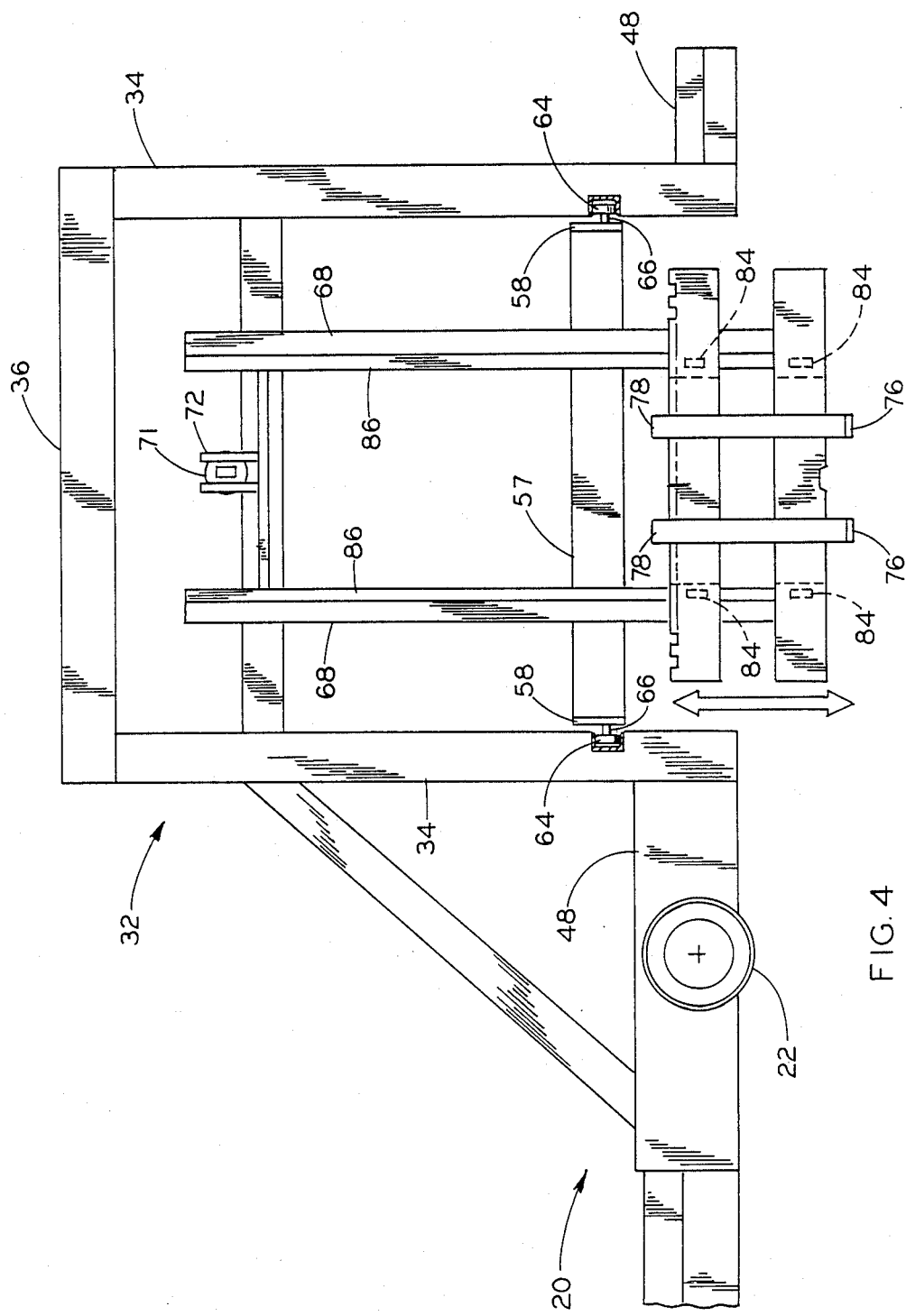
FIG. 4 is a side elevational view of the frame structure of the sod loading and unloading station as shown in FIG. 3.

A lateral or side stacking and unloading station for an automatic sod harvesting apparatus constructed in accordance with the present invention is shown in FIGS. 1 and 2. The front or forward portion of such apparatus is not shown as it is well-known to those skilled in the art. The sod cutting head and driving means may be of conventional construction forming no part of the present invention standing apart from the side stacking and unloading station as disclosed herein.

Briefly, the front portion of such harvesting machines include a front cutter head which severs a strip of sod of a given width from the ground. In most cases, this sod strip is engaged by a pick-up and conveyor mechanism for transport parallel and rearwardly relative to the direction of travel of the apparatus to a sod stacking and unloading station. In most cases, the sod strip is cut into predetermined lengths to form sod pads. Various, well-known arrangements have been employed to provide the length cutting operation, such as shown and described in prior U.S. Pat. Nos. 3,590,927; 3,672,452; 3,887,013; 3,519,082 and others.

In these prior art machines, the sod strip removed from the group is cut to length prior to total removal from the ground or at a later stage after travel along the conveyor means. The present invention contemplates cutting the strip for length during the earlier stages of the process, however, when such a cut takes place is not of great significance regarding the present invention as long as the sod pads are efficiently delivered to a receiving station complementary to the side stacking and unloading station described herein.

The basic harvesting apparatus may be either self-propelled as an integral unit or adapted to be attached to a driven vehicle such as a conventional tractor.

Now referring to FIGS. 1 and 2, the harvesting apparatus includes a mobile main supporting frame, indicated generally at 20, which is provided with appropriate axles having front and rear wheels 22 conventionally mounted thereon. Only the right rear wheel 22 is shown in FIGS. 1 and 2.

Sod pads 24 are transported rearwardly by a conventional conveyor means 26 after being cut to length at the forward end of the apparatus in a conventional manner, not shown.

Conveyor means 26 is shown only for purposes of illustration, as the details of its construction, function and mounting upon such apparatus is well-known.

In the embodiment shown herein, a conventionally driven endless belt 28 is shown disposed above and parallel to the end 30 of conveyor means 26. Endless belt 28 is depicted to merely illustrate well-known means for rolling the generally planar sod pads 24 into cylindrical shaped rolls as is preferred by some commercial operations. However, with respect to the present invention, the sod pads 24 may be folded, or left as is, without departing from the operative aspects of the present invention or the meritorious advantages gained thereby.

The basic function of endless belt 28 is to provide a moving surface in an opposite direction to belt 26, thereby causing the sod pads 24 to be rolled upon themselves as they pass between the opposing moving surfaces and then fall upon a sod receiving station represented by laterally directed conveyor means, indicated generally at 30.

The assembly for endless belt 28 is resiliently mounted, not shown, in a fashion to accommodate the growing circumference of a rolled sod pad 24 as it passes between the opposing moving surfaces.

Conveyor means 30 is conventionally supported to an underlying portion, not shown, of main support frame 20 and is directed at generally right angles relative to the movement of conveyor means 26. This moves the rolled pad 24 toward a sod stacking and unloading station, indicated generally at 32, which is the primary feature of the present invention.

Stacking and unloading station 32 includes an auxiliary support frame operatively connected to portions of the main frame 20. The auxiliary support frame includes vertical beams 34 and a horizontal beam 36 which form an outer archlike support. A pair of horizontal side beams 38 and 40 are conventionally fixed to vertical beams 34 at their outer ends and to rearwardly disposed vertical beams 42 and continue as part of main frame 20. A cross beam 44 is conventionally fixed to the upper ends of beams 42.

The outer end portions of each of the lower horizontal beams 38 include an elongate channel 46 along its inner side forming a horizontally extending guide rail. Additionally, a pair of platform areas 48 are provided on each side of stacking and unloading station 32 to accomodate standing crew members for manual removal of the sod rolls 24 from the cross conveyor means 30 and for stacking the same onto a pallet as will be described in detail later herein. Platform areas 48 are conventionally constructed and comprise steel plates, or the like, and any necessary support beams conventionally connected to the surrounding main frame 20 and auxiliary frame of station 32 of sufficient strength to safely support a workman and any other loads or stresses encountered in a machine of this type.

Access to the most forwardly located platform 48 is provided by a step plate 50 conventionally fixed to main frame 20 and a wheel fender 52 covering wheel 22. Each upper beam 40 also serves as a safety rail for the workman standing on platforms 48.

As shown in FIGS. 1 and 2, a lift assembly, indicated generally at 54, is mounted for horizontal movement within the channels forming guide rails 46. Lift assembly 54 includes a pair of spaced cross members 56 and 57 fixed at their outer ends to a slide plate 58 in any conventional manner, such as welding or the like. A pair of beams 60 are fixed to each cross members 56 and 57 for added strength and stability to aid in support of a fork lift portion, indicated generally at 62, of the lift assembly 54.

As best seen in FIGS. 3–6, a slide plate 58 is provided with a pair of spaced bearing members in the form of rollers 64 rotatably mounted to a respective plate 58 via a pin or shaft 66. Rollers 64 are mounted within the channel forming guide rail 46 to permit plate 58 and the associated cross members 56 and 57 to be freely moved along a given length of beam 38.

Fork lift portion 62 is fixed to the horizontally movable portion of lift assembly 54 and includes a pair of spaced vertical frame members 68 which are welded or otherwise secured in any conventional manner to cross member 57. An upper cross brace 70, fixed between members 68, is operatively connected to a hydraulic piston and cylinder assembly 71 such as at 72. The opposing end of piston and cylinder assembly 71 is conventionally mounted to an appropriate beam structure of main frame 20, such as indicated at 74. In this manner, actuation of piston and cylinder assembly 71 causes lift assembly 54 including fork lift portion 62 to move horizontally along guide rails 46 between extend and retracted positions such as shown in FIGS. 1, 2, 5 and 6.

Fork lift portion 62 includes a pair of outwardly extending fork prongs 76 which include vertical portions 78 fixedly connected to a pair of cross braces 80. In turn, cross braces 80 are fixed to a support plate 81 provided with lug plates 82 which carry spaced rollers 84.

A vertical guide bar 86 is fixed along the inner surfaces of each vertical frame member 68 and form a guide means for rollers 84 during vertical movement of the fork lift portion 62 along the path defined by guide bars 86 upon actuation of piston and cylinder assembly 88.

The vertical movement of fork lift portion 62 via actuation of cylinder assembly 88 is effected via a pulley and chain arrangement 90. Idler pulleys 92 are connected to a common shaft 94 and to the end of the piston rod of cylinder assembly 88. Each pulley 92 carries a suitable chain 95 having one end fixed to a bottom cross brace 96, which in turn, is fixed at each end to vertical frame members 68. The other end of each chain 95 is fixed to support plate 81. The lower end of piston and cylinder assembly 88 is also mounted to bottom cross brace 96. Therefore upon raising or lowering the piston rod of assembly 88, the movement of the chains 95 over the pulleys 92 causes the prongs 76 and their support structure to raise or lower accordingly along the path defined by guide bars 86.

In accordance with the above description, it should be readily understood that lift assembly 54 is mounted for horizontal movement between the extended and retracted positions upon actuation of cylinder assembly 71. The fork lift portions 62 of lift assembly 54, includes vertically movable fork prongs 76, which can be rasied or lowered along the length of guide bars 86 in response to the power cylinder and piston assembly 88 to control the height of the fork prong 76.

In operation, if the main frame is conventionally self-propelled, a driver operating from a conventional cab, not shown, operates the apparatus in a conventional manner to drive and control the sod harvesting function. Preferably, two workers standing on plateform areas 48, catch the rolled sod pads deposited on cross coveyor 30 and load a conventional pallet, such as shown at 100 in FIG. 2, supported by fork prongs 76. If the harvester portion is propelled by a conventional tractor connected to the harvester, the basic operation is essentially identical as it relates to the side stacking and unloading feature of the present invention.

As the sod is harvested in the conventional manner, sod pads 24 travel up conveyor means 26, then under the endless belt 28 and onto cross conveyor 30. The crewman then manually remove each rolled sod pad 24.

Prior to beginning the harvesting operation, the crewman standing on the forward platform area 48 controls the operation of lift assembly 54 and the associated fork lift portion 62 to pick up an empty pallet upon which the sod pads 24 may be stacked. This control is conveniently provided on a panel 101 carrying manually operated control levers 102 and 104. Lever 102 is operatively connected to cylinder and piston assembly 71 to actuate horizontal movement of the lift assembly 54 and lever 104 actuates cylinder and piston assembly 88 to raise or lower fork lift portion 62.

A pallet is easily mounted onto fork prong 76 by appropriate lowering of prongs 76 in connection with outward movement provided by cylinder and piston assembly 71. Prongs 76 are raised to obtain engagement of the empty pallet. The lift assembly 54 is then moved inwardly to a position adjacent conveyor 30. The fork prongs 76 and the empty pallet mounted thereon are then raised to a level which is deemed convenient to reach for the workman standing on platforms 48. Once the lift mechanism is retracted to a convenient loading position and the pallet has been raised, the pad 24 is stacked on the pallet. As the pallet is being filled, the worker next to control levers 102 and 104 manipulates lever 104, preferably via the foot pedal 106 connected to lever 104, to incrementally lower the fork lift portion 62 to maintain the level of the sod pads 24 being stacked upon the pallet at a convenient working height to continued loading.

When the pallet is deemed full, lever 102 is manipulated to cause piston and cylinder assembly 71 to extend and move the lift assembly to the extended position similar to that that shown in FIG. 1. Then by lowering the fork lift portion 62 to allow the pallet to rest on the ground or other supporting surface, retraction of the lift mechanism via lever 102 disengages the prongs 76 from the loaded pallet. The loaded pallet is thus desposited at a lateral spaced location well-removed from the cutting path traversed by the harvesting apparatus. Such manipulation of the lift assembly 54 and associated fork lift portion 62 is similar to operation of a conventional fork lift relative to loading and unloading a pallet.

Since the width of the sod strip being cut is significantly less than the total width of conventional rear unloading harvesters as well as less than the harvester constructed in accordance with the present invention, it should be readily understood that a pallet unloaded at right angles to the path of travel, as described herein, is disposed in a non-interfering location relative to the next contiguous pass of the harvester over the sod field.

Therefore harvesting operations may continue, if desirable, without regard to and completely independent of the pace at which the loaded pallets are picked up for transport from the sod field.

It should also be noted that providing a horizontally movable fork lift assembly as described herein permits the harvester to be designed with a width not substantially wider than prior conventional rear unloading sod harvester configurations so as not to prevent travel of the apparatus over public roads to move from one sod field to another at a distant location. This may be accomplished by a slight off-set relationship between the cab portion and the main conveyor 26 and cutting head relative to the centerline of the frame.

In view of the foregoing description, it should be readily understood that the present invention represents a significant improvement in handling the sod pads harvested in an otherwise conventional manner as compared to prior art apparatus. The present invention eliminates a prior long-known problem between the harvesting operation and the pick-up and removal of the loaded pallets from the field.

If desired, the harvesting and pallet loading may be done without a concurrent pallet pick-up operation. This permits one of the harvesting crew to pick up the loaded pallets after the harvesting is complete thus eliminating one crewman from the usual complement of workers necessary using prior art harvester constructions.

What is claimed is:

1. In an automatic sod harvesting machine for harvesting sod pads of predetermined length and width; the combination of: a mobile main support frame; a conveyor for transporting said sod pads rearwardly, parallel to the direction of travel of said support frame; a sod pad receiving station disposed on said support frame rearwardly of said conveyor; a sod pad loading station mounted to said support frame and including an auxiliary frame means provided with a pair of guide rails extending laterally at generally a right angle to the path of travel of said main frame and longitudinally spaced from one another to define an opening for the ingress and egress of a sod-receiving pallet; a fork lift assembly mounted between said guide rails for horizontal movement between extended and retracted positions and including fork prongs extending parallel to said guide rails and mounted to said lift assembly for vertical movement between raised and lowered positions.

2. The apparatus defined in claim 1 including drive means operatively connected to said lift assembly and actuator means connected to said drive means for manual control of the horizontal and vertical position of said fork prongs.

3. The apparatus defined in claim 1 wherein each of said guide rails include a longitudinally extending inward facing channel defining a horizontal path of travel; and said fork lift assembly includes a frame means extending between said channels, a pair of bearing members connected to said frame means and mounted in said channels for travel along said horizontal path, a pair of vertically extending laterally spaced guide members fixedly mounted to the forward end of said frame means, and a fork prong assembly mounted to said vertical guide members for selective vertical movement independent of the horizontal movement of said frame means.

4. The apparatus defined in claim 1 wherein said retracted position places said fork prongs in an adjancent lateral relationship relative to said sod pad receiving station and said extended position places said fork prongs beyond an outer end of each of said guide rails and an outer edge of said main support frame.

5. A mobile automatic sod harvesting apparatus for harvesting sod pads of predetermined length and width comprising, in combination, a main frame; wheel means rotatably mounted to said frame for travel along the ground; conveyor means mounted on said frame and extending longitudinal to the direction of travel of said frame for engaging said sod pads and transporting said pads from a forward position toward the rear of said frame; a receiving station mounted to said frame rearwardly of said conveyor means for receiving the sod pads; a sod stacking and unloading station disposed adjacent to said receiving station and connection to said main frame and including a pair of spaced guide rail means extending outwardly from said frame generally at a right angle to the direction of travel of said main frame and defining an opening at their outward ends; a pallet receiving lift assembly slideably mounted to said guide rail means for horizontal travel between a retracted and an extended position, said lift assembly including fork prongs extending parallel to said rail means and mounted for independent vertical movement between raised and lowered position.

6. In a traveling automatic sod harvesting apparatus of the type which removes and severs a sod strip into sod pads of predetermined length along its path of travel, the combination of: a wheeled main support frame; conveyor means mounted on said frame for transporting sod pads rearwardly and parallel to the path of travel of said main support frame; a sod pad receiving station disposed on said main frame rearward of said conveyor means; a sod-stacking and unloading station provided on said main frame and disposed laterally to said sod pad receiving station relative to the path of travel of said main frame and including pallet handling means for releasably engaging a sod-receiving pallet and horizontal displacement of said pallet toward and away from said sod receiving station in a direction generally transverse to the path of travel of said main frame to define a retracted sod stacking position and an extended pallet unloading position.

7. The apparatus defined in claim 6 wherein said means for releasably engaging said pallet includes a pair of horizontally extending fork prongs mounted for vertical movement between raised and lowered positions independent of the horizontal displacement of said pallet handling means.

* * * * *